US009673575B1

(12) United States Patent
Hall et al.

(10) Patent No.: US 9,673,575 B1
(45) Date of Patent: Jun. 6, 2017

(54) ELECTRICALLY CONDUCTIVE WALL HOOKS

(71) Applicants: David R. Hall, Provo, UT (US); Joseph Blanch, Provo, UT (US); Andrew Priddis, Mapleton, UT (US); Johnathan Conley, Provo, UT (US)

(72) Inventors: David R. Hall, Provo, UT (US); Joseph Blanch, Provo, UT (US); Andrew Priddis, Mapleton, UT (US); Johnathan Conley, Provo, UT (US)

( * ) Notice: Subject to any disclaimer, the term of this patent is extended or adjusted under 35 U.S.C. 154(b) by 0 days.

(21) Appl. No.: 15/277,090

(22) Filed: Sep. 27, 2016

(51) Int. Cl.
*H02G 3/20* (2006.01)
*H01R 13/73* (2006.01)
*H01R 13/24* (2006.01)
*H01R 33/92* (2006.01)

(52) U.S. Cl.
CPC ......... *H01R 13/73* (2013.01); *H01R 13/2471* (2013.01); *H01R 33/92* (2013.01)

(58) Field of Classification Search
CPC ................................ H02G 3/20; F04D 25/088
USPC .................................................. 439/530, 529
See application file for complete search history.

(56) References Cited

U.S. PATENT DOCUMENTS 1,269,748 A * 6/1918 Root ....................... F21V 23/06 362/398
1,607,712 A * 11/1926 White ...................... H02G 3/20 439/530
2,300,487 A * 11/1942 Conteville .............. F21V 21/03 362/404
5,067,906 A * 11/1991 Woodgate ............ H01R 25/142 439/115
5,308,247 A * 5/1994 Dyrdek ............. B32B 17/10036 248/475.1
6,419,379 B1 * 7/2002 Hulse ................... B60N 2/4686 362/154
6,480,378 B2 * 11/2002 Chang ..................... B60R 11/02 361/679.41
7,722,377 B2 * 5/2010 Moore ............... H01R 13/6392 439/341
2004/0209514 A1 * 10/2004 Marshall Yoe ........ A45D 20/12 439/529
2012/0062175 A1 * 3/2012 Miller ...................... H02J 7/025 320/108
2016/0020562 A1 * 1/2016 Birdwell ................ H01R 43/26 439/529
2016/0172797 A1 * 6/2016 Dry ......................... B60R 11/02 439/529

* cited by examiner

*Primary Examiner* — Gary Paumen

(57) ABSTRACT

The invention is an electrically conductive wall hook. The invention is a means to provide power to an object that is being stored in a hanging position. The invention is made up of two parts. The first part is a housing attached to an object to be stored that contains an opening. The second part is a hook attached to a wall. Both the housing and the hook contain electrical conductors. When the hook is fitted securely inside the opening of the housing, the object is suspended from the hook, and the electrical conductors within the housing and the hook mate with each other. The electrical conductor inside the hook is attached to electrical power so that electrical power is provided to the object that is suspended from the hook.

11 Claims, 9 Drawing Sheets

ELECTRICALLY CONDUCTIVE WALL HOOKS

CROSS-REFERENCES

Technical Field

This invention relates generally to the field of fasteners, and more specifically to electrically conductive fasteners.

BACKGROUND

A typical household utilizes numerous appliances for functioning in everyday life, and many of these appliances require electricity to operate. Most electrical appliances come equipped with a power cord that is plugged into an outlet in order to receive the necessary power. Frequently, when an electrical appliance is not in use, the power cord is wrapped up (often in a rather haphazard fashion), and the appliance is put away into some sort of storage area. However, this ordinary process has several disadvantages.

First, it is inconvenient to repeatedly remove an item from storage for use, to plug it in to an electrical outlet, and then to unplug and return it again. This is not to mention the difficulty of wrapping up and storing power cords, which are built rather inflexibly and often end up in only a tangled mess. Leaving all appliances out of storage and always available for use might be an option, but besides the lack of adequate counter space, there are often not enough outlets to accommodate powering multiple items simultaneously. Power strips help to solve this problem by providing more outlets to connect with, but plugging multiple power cords into the same location may result in the cords becoming tangled or becoming a tripping hazard. In addition, many power cords coming from multiple appliances can be an eye-sore.

Many of these problems could be solved by a system that allows items to be conveniently stored and also electrically powered by means of the structure that stores the items simultaneously. For example, an automated storage and retrieval system that stored all items in a ready-to-use, powered state and then brought needed items to a convenient access point for use would be ideal. The frequent movement of the items would make it necessary to eliminate the need for power cords entirely. Therefore, what is needed is an apparatus that can provide a power connection without a power cord and provide a supporting structure for storage items within the storage system too. Some methods have been developed that provide a quicker means of connecting an object to power than plugging a power cord into an outlet. However, most of these power connection methods are complex designs and do not provide a support structure for the object. Therefore, two separate actions are still required to store an object and connect it to power. What is needed is an apparatus of a simple design that provides both power and a support structure for a stored object.

SUMMARY OF THE INVENTION

The disclosed invention has been developed in response to the present state of the art and, in particular, in response to the problems and needs in the art that have not yet been fully solved by currently available components and methods. Accordingly, efficient structural components and methods have been developed to allow an apparatus to provide both electrical power and a support structure for an object.

Consistent with the foregoing, an electrically conductive wall hook is disclosed. The electrically conductive wall hook is an apparatus comprising a first member mounted to a suspendable object. The first member comprises an insulative housing comprising an opening that comprises a first electrical conductor. The apparatus further comprises a second member mounted to a wall. The second member comprises a hook that is dimensioned to fit securely inside the opening such that the suspendable object is suspended from the wall when the hook is fitted securely inside the opening. The hook comprises a second electrical conductor that is coupled to a source of electrical power, and the first and second electrical conductors are positioned so as to mate when the hook is fitted securely inside the opening.

In some embodiments, the first and second electrical conductors comprise pins, preferably spring-loaded pins. In other embodiments, the first and second electrical conductors comprise a pin and a pin receptacle. In some embodiments, the suspendable objects are any of a variety of electrical appliances, and in other embodiments they are storage bins, some of which comprise electrical outlets. In some embodiments, the insulated housing comprises plastic or rubber, is of a rectangular prismatic configuration, or has particular dimensions. In some embodiments, the hooks comprise an insulating material, protrude from the wall at a ninety-degree angle, or support a particular amount of weight.

BRIEF DESCRIPTION OF THE DRAWINGS

A more particular description of the invention briefly described above is made below by reference to specific embodiments depicted in drawings included with this application, in which.

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

Figure 1:
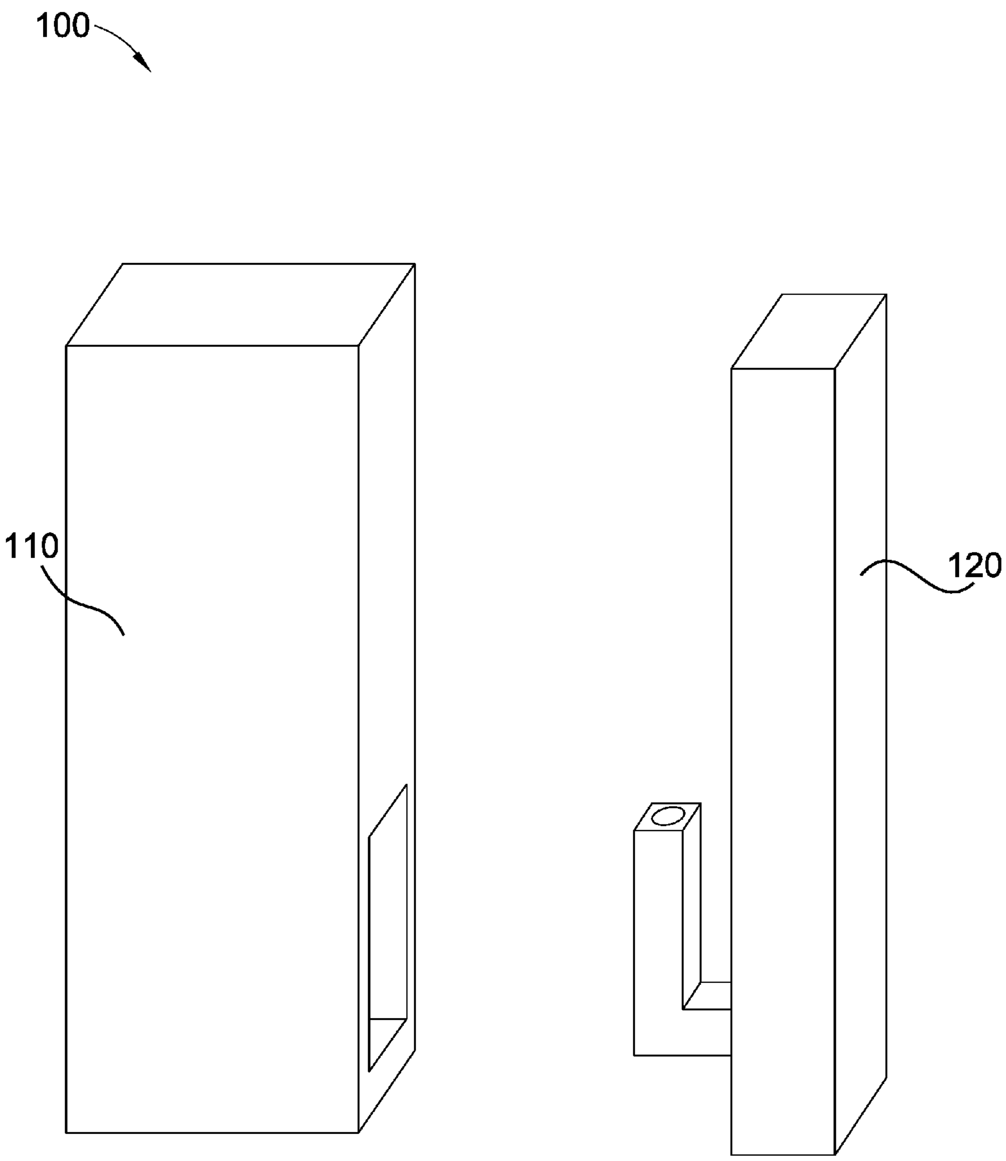
FIG. 1 depicts one embodiment of the invented apparatus comprising a first member and a second member.

FIG. 1 depicts one embodiment of the invented apparatus 100 comprising a first member 110 and a second member 120. Each member is described in more detail below.

Figure 2B:
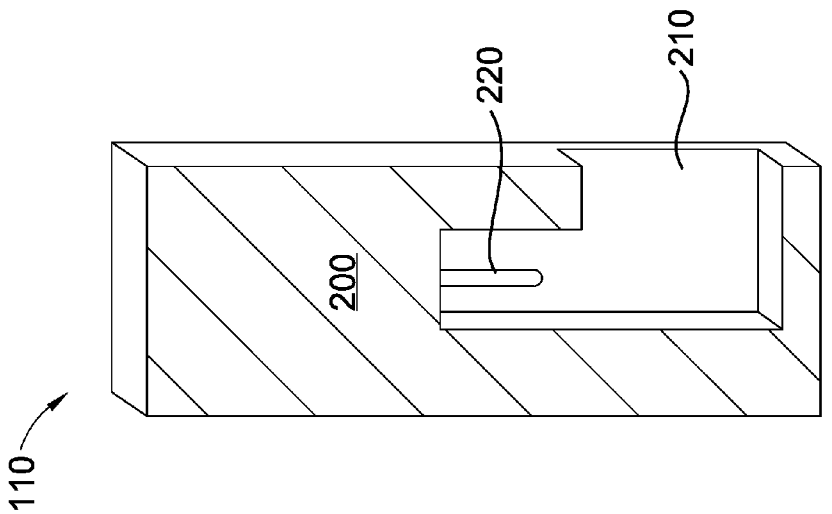
FIG. 2B depicts an interior view of one embodiment of the first member.
Figure 2A:
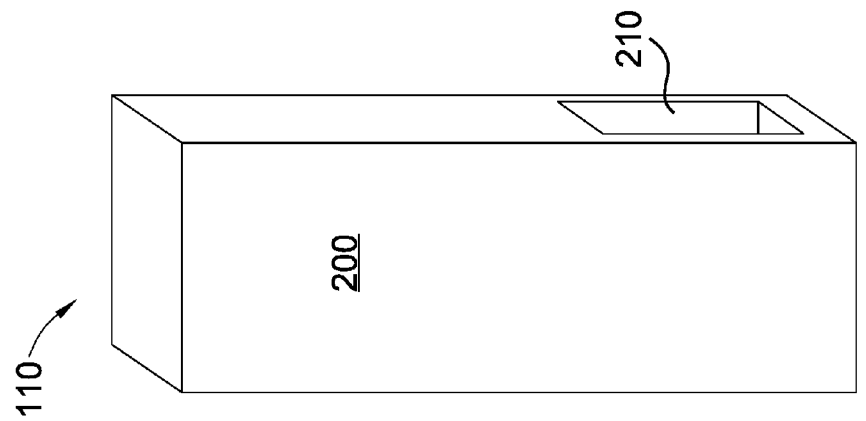
FIG. 2A depicts an exterior view of one embodiment of the first member.

FIG. 2A and FIG. 2B depict views of one embodiment of the first member 110. FIG. 2A depicts an exterior view. FIG. 2B depicts an interior view. The first member 110 comprises an insulative housing 200. In different embodiments, the insulative housing 200 comprises plastic or rubber. The preferred embodiment comprises plastic. In a preferred embodiment, the insulative housing 200 comprises a rectangular prismatic configuration. Other embodiments comprise other configurations. In a preferred embodiment, the insulative housing 200 measures approximately 1.5 inches (3.81 cm.) high by 0.3 inches (0.76 cm.) wide by 0.5 inches (1.27 cm.) deep. The insulative housing 200 comprises an opening 210, which comprises a first electrical conductor 220. In a preferred embodiment, the first electrical conductor 220 comprises a pin. In one embodiment, the pin is a spring-loaded pin. The flexibility of a spring-loaded pin ensures that the pin will establish a secure electrical connection. In another embodiment, the first electrical conductor 220 comprises a receptacle. The first electrical conductor 220 is positioned so as to mate with a second electrical conductor inside the second member 120.

Figure 3A:
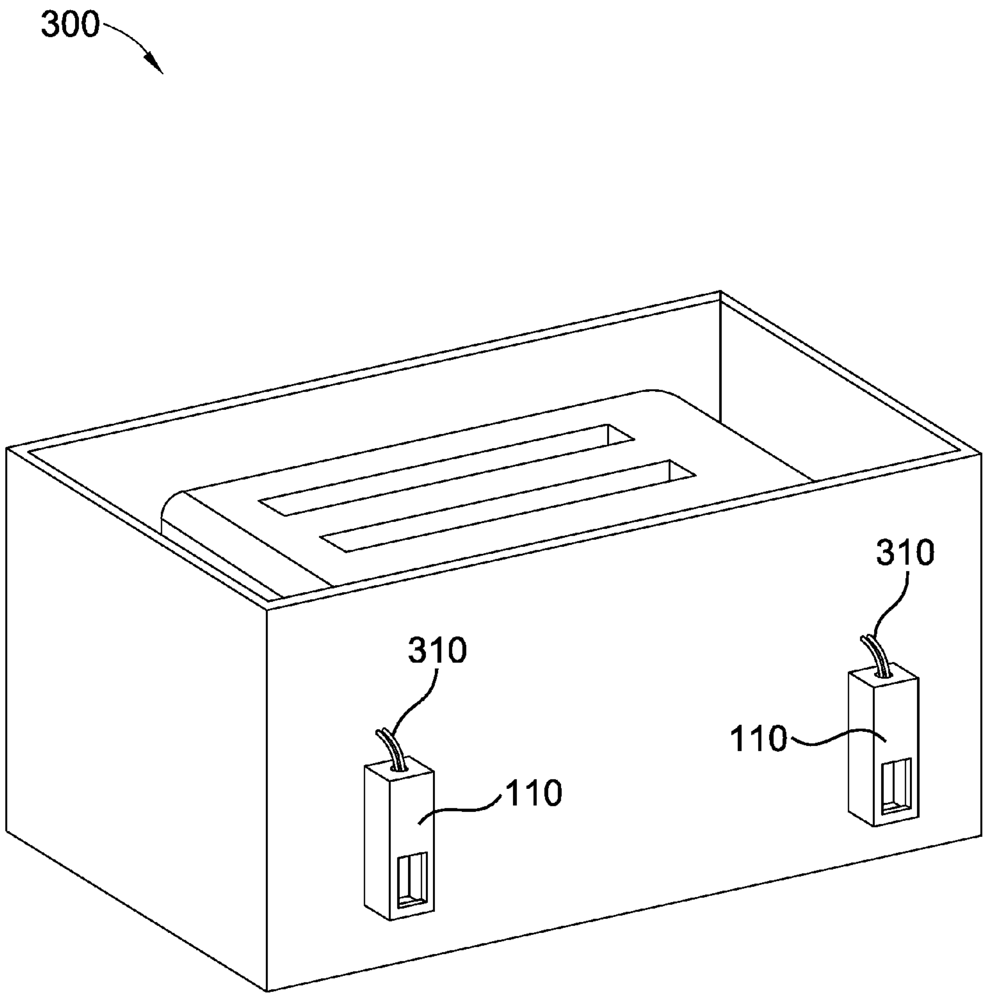
FIG. 3A depicts one embodiment of the first member mounted to the outside of a suspendable object, such that the first member protrudes from the suspendable object.
Figure 3B:
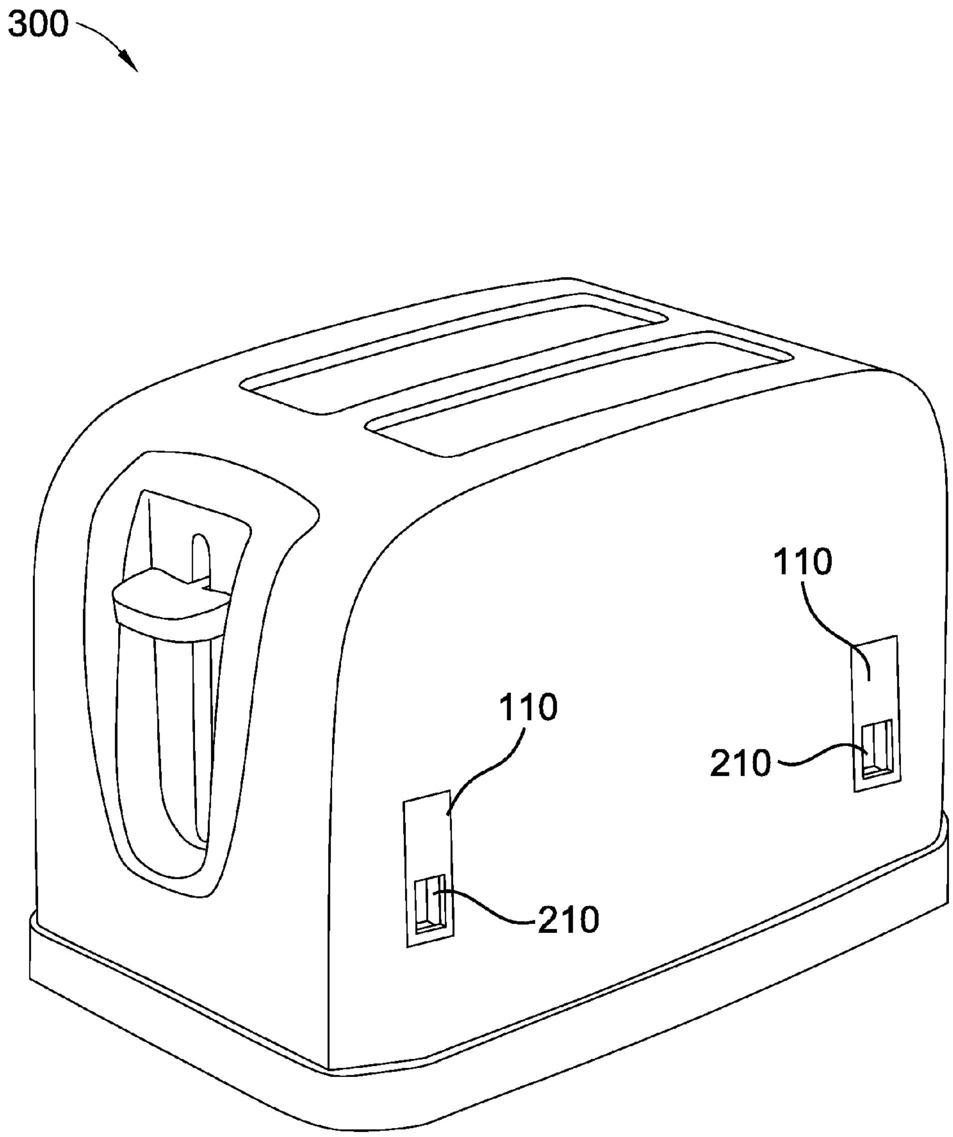
FIG. 3B depicts one embodiment of the first member mounted inside the suspendable object, such that only the opening is visible from an outside view of the suspendable object.

The first member 110 is mounted to a suspendable object 300. FIG. 3A and FIG. 3B depict views of one embodiment of a first member 110 mounted to a suspendable object 300. In a preferred embodiment, two first members 110 are mounted to each suspendable object 300, with one first member 110 connected to hot wires and a second first member 110 connected to neutral wires, allowing for a complete electrical circuit. The first member 110 can be mounted in a variety of ways. In one embodiment, the first member 110 is mounted to the outside of the suspendable object 300, such that the first member 110 protrudes from the suspendable object 300. FIG. 3A depicts this embodiment. In this embodiment, electrical wires 310 extend from the first electrical conductor 220 inside the first member 110 into the suspendable object 300, seen or unseen, providing the suspendable object 300 with electrical power. Preferably, hot electrical wires extend from the first electrical conductor 220 inside one first member 110, and neutral electrical wires extend from the first electrical conductor 220 inside a second first member 110 mounted to the suspendable object 300, such that a complete electrical circuit is created between the two first members 110 that are mounted to the suspendable object 300. In another embodiment, the first member 110 is mounted to the inside of the suspendable object 300, such that only the opening 210 is visible from an outside view of the suspendable object 300. This embodiment is depicted in FIG. 3B. In this embodiment, electrical wires 310 extend from the first electrical conductor 220 inside the first member 110 into the suspendable object 300, unseen, providing electrical power to the suspendable object 300. Again, preferably hot electrical wires extend from the first electrical conductor 220 inside one first member 110, and neutral electrical wires extend from the first electrical conductor 220 inside a second first member 110 mounted to the suspendable object 300, such that a complete electrical circuit is created between the two first members 110 that are mounted to the suspendable object 300. In one embodiment, the suspendable object 300 is an electrical appliance selected from the group consisting of microwaves, refrigerators, ice machines, heaters, toasters, mixers, ovens, juicers, dryers, grinders, dispensers, freezers, gas and electric cook tops, gas and electric ranges, bread machines, humidifiers, and grills. FIG. 3B depicts the suspendable object 300 comprising a toaster. In another embodiment, the suspendable object 300 comprises a storage bin. FIG. 3B depicts the suspendable object 300 comprising a storage bin holding a toaster. In one embodiment, the storage bin is fitted with an electrical outlet.

Figure 4:
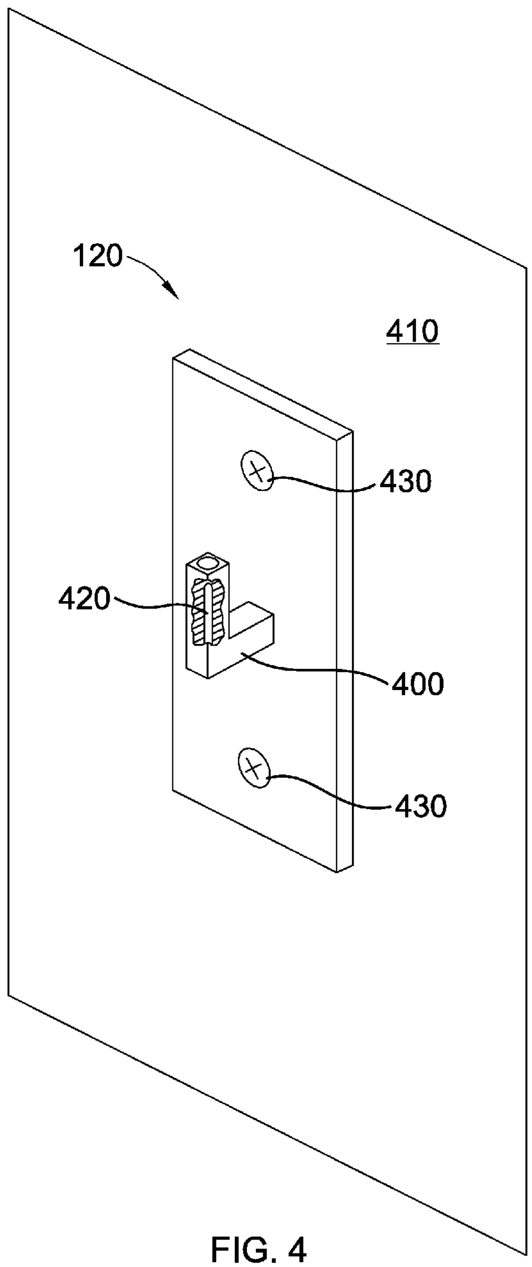
FIG. 4 depicts one embodiment of the second member.

FIG. 4 depicts one embodiment of a second member 120. The second member 120 is mounted to a wall 410. It is mounted to the wall 410 using connectors 430. In one embodiment, the connectors 430 are screws. The second member 120 also comprises a hook 400. The hook 400 is dimensioned to fit securely inside the opening 210 of the first member 110 such that the suspendable object 300 is suspended from the wall 410 when the hook 400 is fitted securely inside the opening 210. In one embodiment, the hook 400 comprises an insulating material, preferably plastic. In one embodiment, the hook 400 protrudes from the wall 410 at a ninety-degree angle. In one embodiment, the hook 400 supports twenty pounds (9.07 kilograms) of weight. Furthermore, the hook 400 comprises a second electrical conductor 420 that is coupled to a source of electrical power. The second electrical conductor 420 is positioned so as to mate with the first electrical conductor 220 when the hook 400 is fitted securely inside the opening 210 of the first member 110. In a preferred embodiment, the second electrical conductor 420 comprises a pin. In one embodiment, the pin comprises a spring-loaded pin. The flexibility of a spring-loaded pin ensures that the pin will establish a secure electrical connection. In another embodiment, the second electrical conductor 420 comprises a receptacle. In a preferred embodiment, the source of electrical power that is coupled to the second electrical conductor 420 is located inside the wall 410. In this embodiment, the source of electrical power comprises electrical wires, one hot and one neutral. In a preferred embodiment, each suspendable object 300 is suspended from two second members 120 comprising hooks 400. In this preferred embodiment, hot electrical wires extend to the second electrical conductor 420 inside one hook 400, and neutral electrical wires extend to the second electrical conductor 220 inside a second hook 400. This allows a complete electrical circuit to be created extending from the source of electrical power. In one embodiment, the wall 410 to which each second member 420 is mounted comprises two metal rails, one wired to be hot and the other one wired to be neutral. The second members 420 are mounted on these rails. In one embodiment, the source of electrical power is equipped with a ground fault circuit interrupter (GFCI).

Figure 5:
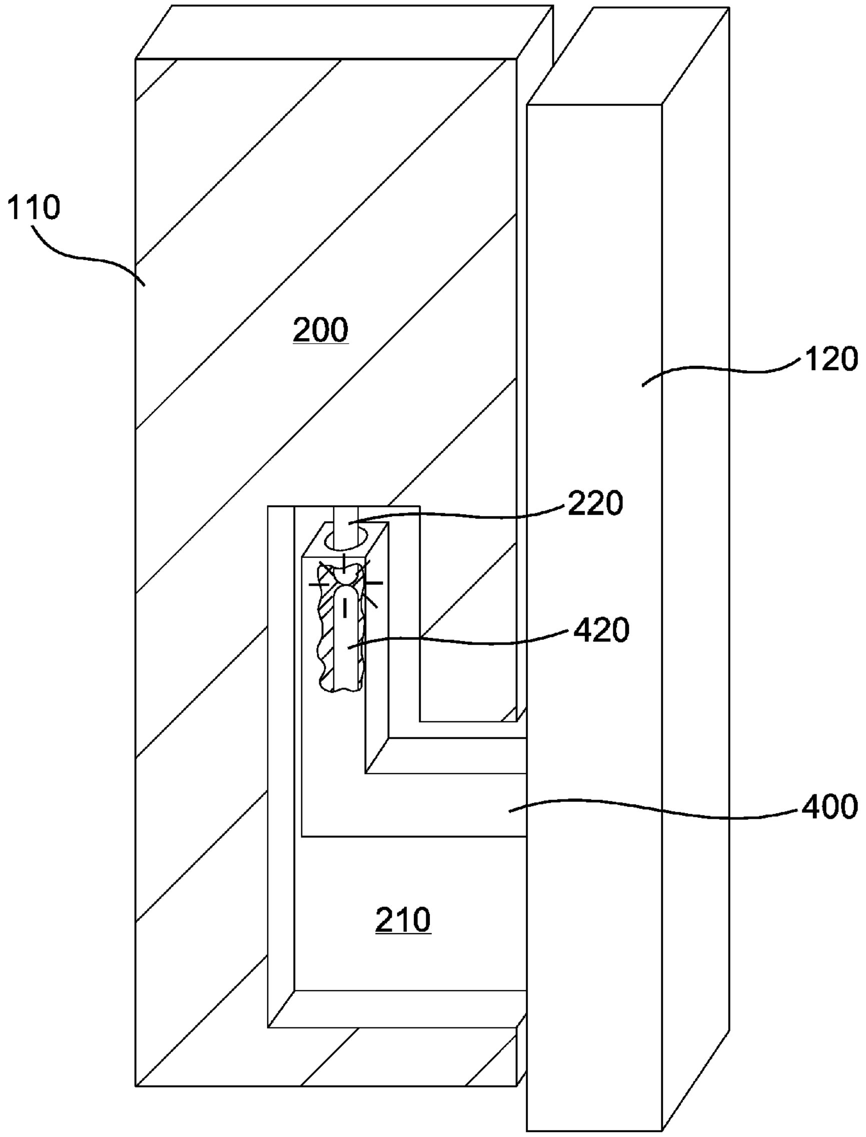
FIG. 5 depicts one embodiment of the hook of the first member fitted securely inside the opening of the second member and the first electrical conductor and the second electrical conductor positioned so as to mate when the hook is fitted securely inside the opening.

FIG. 5 depicts one embodiment of the hook 400 of the first member 110 fitted securely inside the opening 210 of the second member 120 and the first electrical conductor 220 and the second electrical conductor 420 positioned so as to mate when the hook 400 is fitted securely inside the opening 210. The hook 400 is dimensioned to fit securely inside the opening 210. After the hook 400 is inserted into the opening 210, because the opening 210 extends upward beyond the top of the hook 400, the first member 110 shifts downward until the hook 400 catches the first member 110. At that point, the first electrical conductor 220 and the second electrical conductor 420 mate, creating an electrical current, which provides electrical power from the electrical source to which the second electrical conductor 420 is coupled, preferrably located inside the wall 410, to the suspendable object 300 that is suspended from the wall 410 when the hook 400 is fitted securely inside the opening 210. In one embodiment, the first and second electrical conductors 220 and 420 are pins, preferably spring-loaded pins. In another embodiment, the first and second electrical conductors 220 and 420 comprise a pin and a pin receptacle.

Figure 6A:
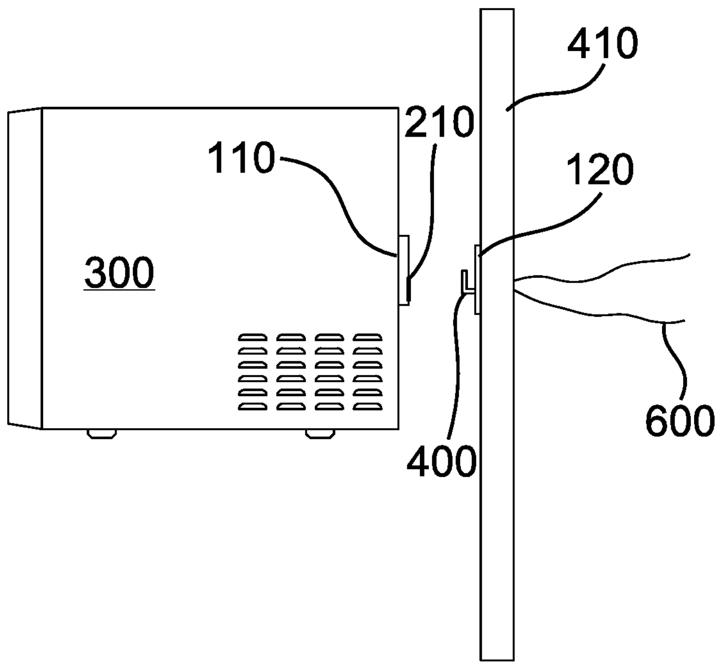
FIG. 6A depicts a side view of one embodiment of a first member that is mounted to a suspendable object, and a second member that is mounted to a wall.
Figure 6B:
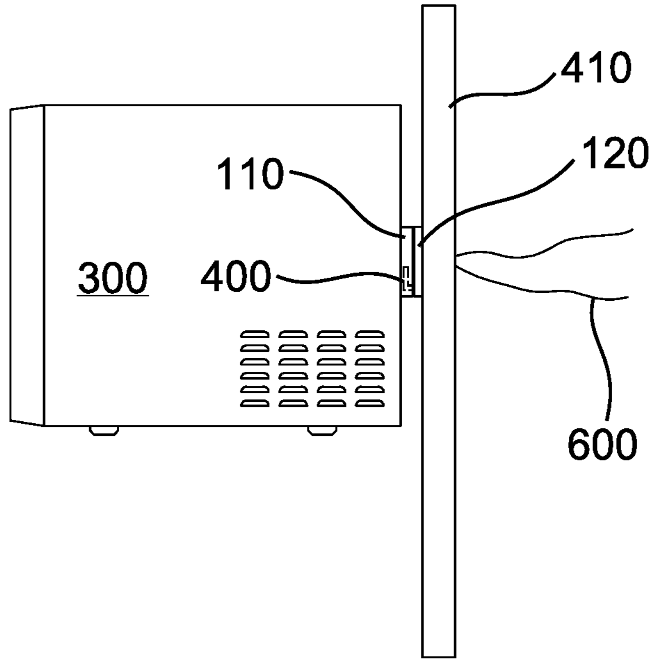
FIG. 6B depicts a side view of one embodiment of a suspendable object being suspended from the wall when the hook is fitted securely inside the opening.

FIG. 6A and FIG. 6B depict side views of a suspendable object 300 being suspended from the wall 410 when the hook 400 is fitted securely inside the opening 210. FIG. 6A depicts a first member 110 that is mounted to the suspendable object 300, and a second member 120 that is mounted to the wall 410. The first member 110 comprises an insulative housing 200 comprising an opening 210. The second member 120 comprises a hook 400. The hook 400 is dimensioned to fit securely inside the opening 120. When the hook 400 is fitted securely inside the opening 210, the suspendable object 300 is suspended from the wall 410, as depicted in FIG. 6B. The first member 110 also comprises a first electrical conductor 220. The hook 400 of the second member 120 comprises a second electrical conductor 420 that is coupled to a source of electrical power 600. The first electrical conductor 220 and the second electrical conductor 420 are positioned so as to mate when the hook 400 is fitted securely inside the opening 210. In this way, the positionable object 300 is provided with electrical power when it is hung on the wall 410, without the need for other outlets or plugs. In a preferred embodiment, the source of electrical power 600 that is coupled to the second electrical conductor 420 is located inside the wall 410. In this embodiment, the source of electrical power 600 comprises electrical wires, one hot and one neutral. In a preferred embodiment, each suspendable object 300 is suspended from two second members 120 comprising hooks 400. In this preferred embodiment, hot electrical wires extend to the second electrical conductor 420 inside one hook 400, and neutral electrical wires extend to the second electrical conductor 220 inside a second hook 400. This allows a complete electrical circuit to be created extending from the source of electrical power. In one embodiment, the wall 410 to which each second member 420 is mounted comprises two metal rails, one wired to be hot and the other one wired to be neutral. The second members 420 are mounted on these rails. In one embodiment, the source of electrical power is equipped with a ground fault circuit interrupter (GFCI).

Figure 7:
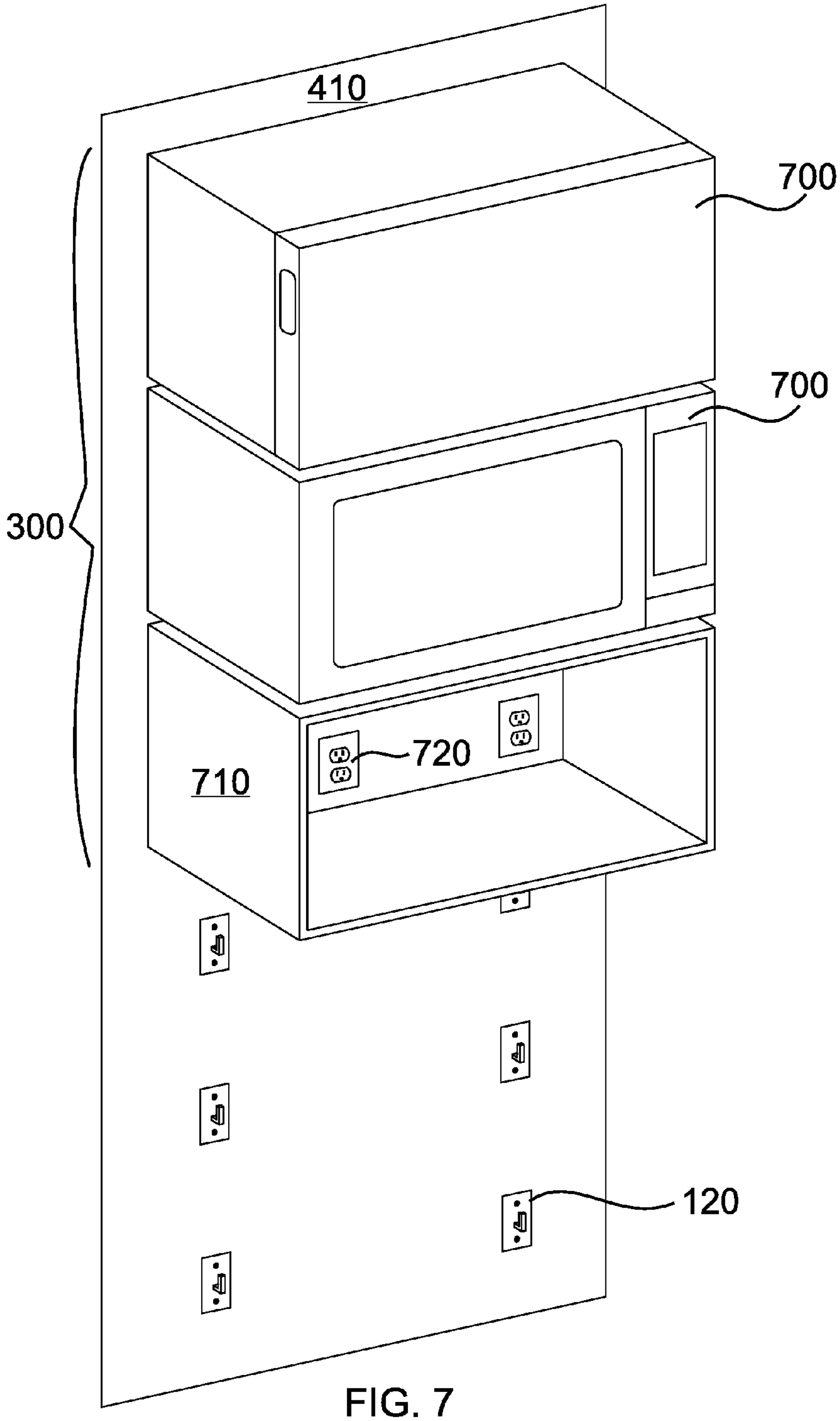
FIG. 7 depicts a front view of one embodiment of several suspendable objects suspended from a wall.

FIG. 7 depicts a front view of several suspendable objects 300 suspended from a wall 410. In one embodiment, the suspendable objects 300 are electrical appliances 700 selected from the group consisting of microwaves, refrigerators, ice machines, heaters, toasters, mixers, ovens, juicers, dryers, grinders, dispensers, freezers, gas and electric cook tops, gas and electric ranges, bread machines, humidifiers, and grills. In another embodiment, the suspendable objects 300 comprise storage bins 710. In one embodiment, each storage bin 710 is fitted with an electrical outlet 720.

Figure 8:
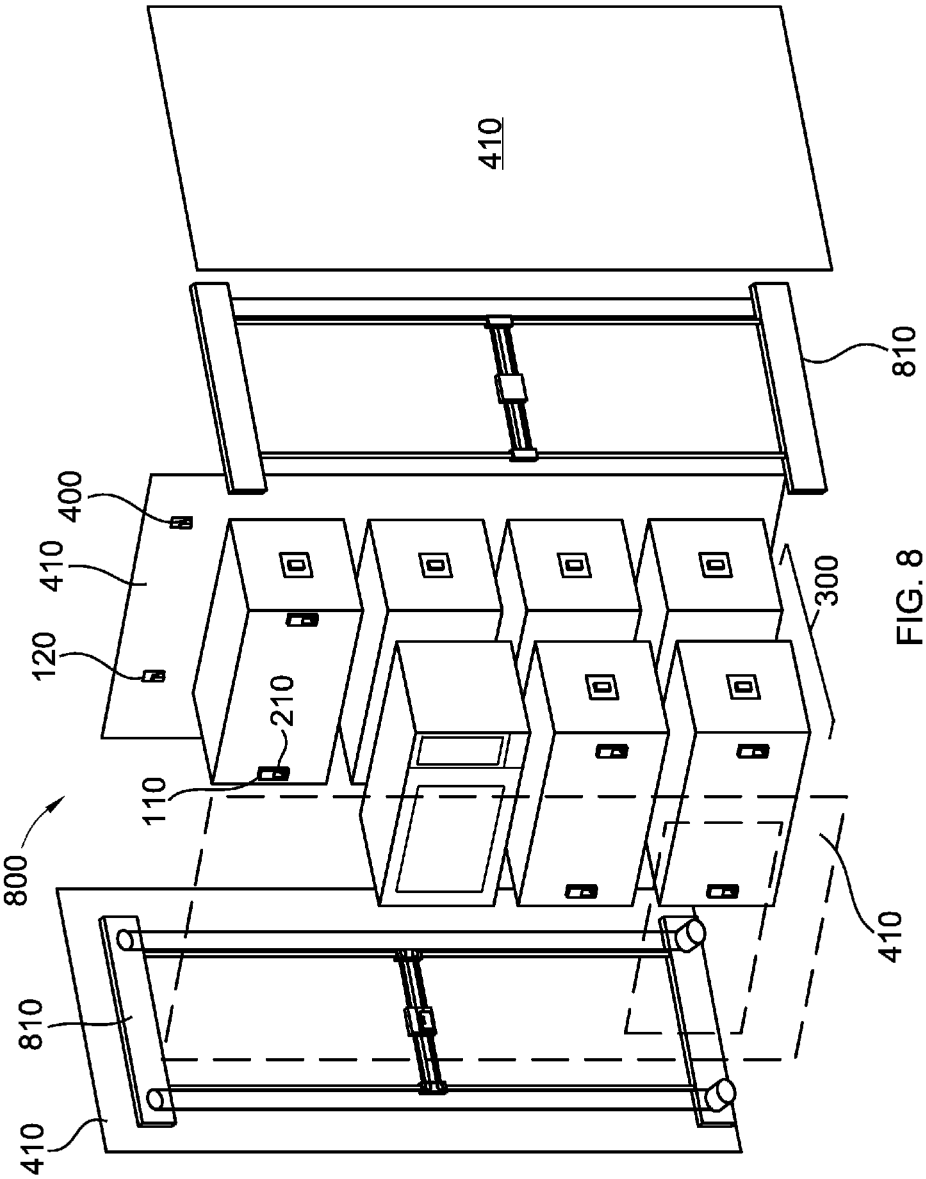
FIG. 8 depicts one embodiment of the invented apparatus utilized in an automated storage and retrieval system.

FIG. 8 depicts the invented apparatus 100 utilized in an automated storage and retrieval system 800. One example of an automated storage and retrieval system 800 comprises one or more walls 410 arranged to create a frame. Arranged within the one or more walls 410 are one or more suspendable objects 300. At least one first member 110 is mounted to each suspendable object 300. A second member 120 to correspond with each first member 120 is mounted to a wall 410. Each suspendable object 300 is suspended from a wall 410 when the hook 400 of each second member 120 is fitted securely inside an opening 210 of each first member 110. A first electrical conductor 220 and a second electrical conductor 420 (not pictured in FIG. 8) also mate when the hook 400 is fitted securely inside the opening 210, connecting the suspendable objects 300 to electrical power. One or more mechanisms 810 for lifting and moving the suspendable objects 300 are mounted to the one or more walls 410. Hanging the one or more suspendable objects 300 using the invented apparatus 100 in an automated storage and retrieval system 800 allows each suspendable object 300 to be connected to electrical power during storage, without regard to where each suspendable object is moved by the mechanisms 810. This is particularly beneficial when storing electrical appliances, which may be done in order to conserve the space that the appliances would otherwise occupy. For example, if one suspendable object 300 were a bread machine, a user could add ingredients to the bread machine and instruct the bread machine to start a bread making cycle. While the cycle is underway, the bread machine requires little or no monitoring by the user, but it does require electrical power. The user can insert the bread machine into an automated storage and retrieval system 800 that utilizes the present invention. As the bread machine is stored, it has a nearly continuous supply of electrical power that enables the bread machine to complete the bread making cycle even while being stored and moved around within the automated storage and retrieval system 800. This is one preferred application of the present invention, but many other applications also exist.

The invention claimed is:

1. An apparatus comprising:

a first member mounted to a suspendable object comprising an insulative housing comprising an opening comprising a first electrical conductor comprising a spring-loaded pin; and a second member mounted to a wall comprising a hook, the hook dimensioned to fit securely inside the opening such that the suspendable object is suspended from the wall when the hook is fitted securely inside the opening, and the hook comprising a second electrical conductor comprising a spring-loaded pin that is coupled to a source of electrical power, the first and second electrical conductors positioned so as to mate when the hook is fitted securely inside the opening.

2. The apparatus of claim 1, wherein the first and second electrical conductors comprise a pin and a pin receptacle.

3. The apparatus of claim 1, wherein the suspendable object is an electrical appliance selected from the group consisting of microwaves, refrigerators, ice machines, heaters, toasters, mixers, ovens, juicers, dryers, grinders, dispensers, freezers, gas and electric cook tops, gas and electric ranges, bread machines, humidifiers, and grills.

4. The apparatus of claim 1, wherein the suspendable object comprises a storage bin.

5. The apparatus of claim 4, wherein the storage bin is fitted with an electrical outlet.

6. The apparatus of claim 1, wherein the insulative housing comprises plastic or rubber.

7. The apparatus of claim 1, wherein the hook comprises an insulating material.

8. The apparatus of claim 1, wherein the insulative housing comprises a rectangular prismatic configuration.

9. The apparatus of claim 1, wherein the insulative housing measures approximately 1.5 inches (3.81 cm.) high by 0.3 inches (0.76 cm.) wide by 0.5 inches (1.27 cm.) deep.

10. The apparatus of claim 1, wherein the hook protrudes from the wall at a ninety-degree angle.

11. The apparatus of claim 1, wherein the hook supports 20 pounds (9.07 kilograms) of weight.

* * * * *